No. 837,025. PATENTED NOV. 27, 1906.
S. ANDERSON.
GATE.
APPLICATION FILED DEC. 16, 1905.
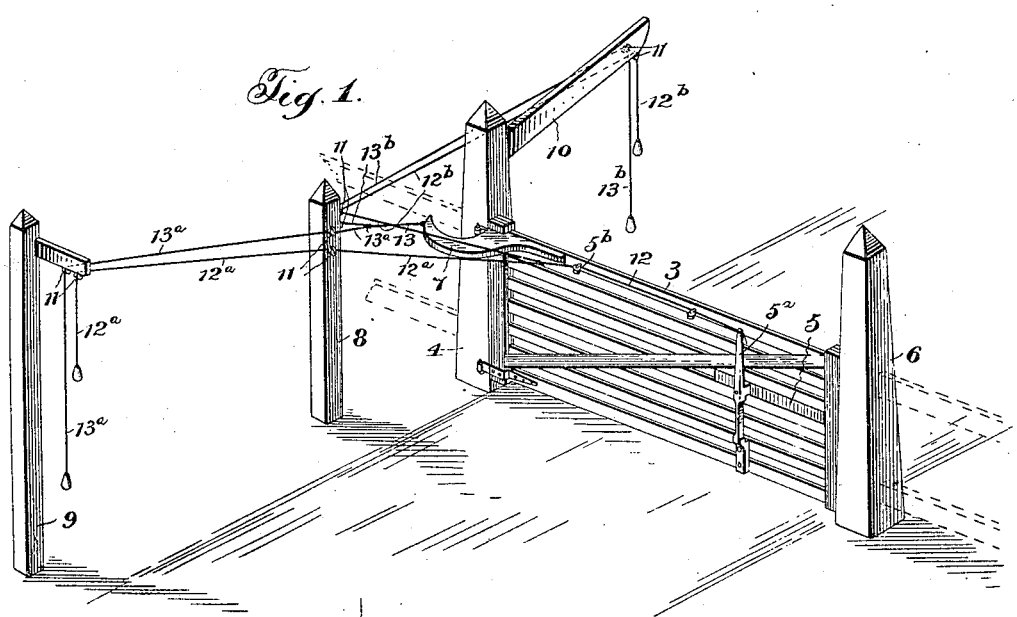
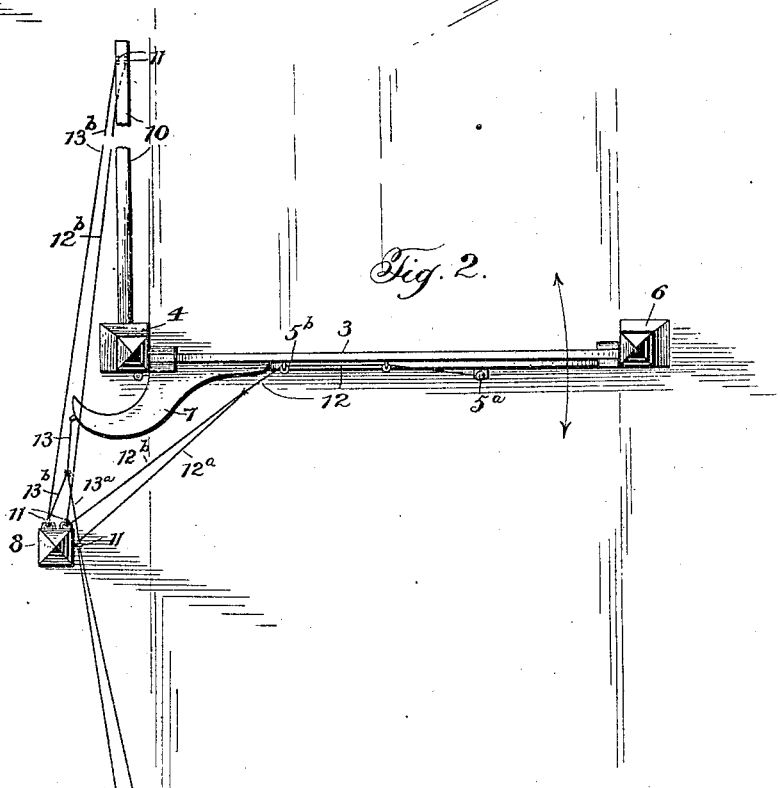
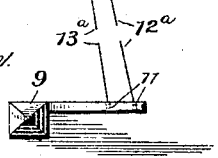
Witnesses:
Jas. E. Hutchinson
Thos. R. Heath
Inventor:
Sylvester Anderson,
By Royal E. Burnham, Attorney

UNITED STATES PATENT OFFICE.

SYLVESTER ANDERSON, OF WILLIAMS, INDIANA.

GATE.

No. 837,025.   Specification of Letters Patent.   Patented Nov. 27, 1906.

Application filed December 16, 1905. Serial No. 292,076.

*To all whom it may concern:*

Be it known that I, SYLVESTER ANDERSON, a citizen of the United States, residing at Williams, in the county of Lawrence and State of Indiana, have invented certain new and useful Improvements in Gates, of which the following is a specification, reference being had therein to the accompanying drawings.

This invention relates to means whereby a gate can be readily and easily opened and shut by a person in a vehicle or on horseback without alighting to the ground.

The means for operating the gate is so arranged that the gate may be placed at the intersection of a private road and a highway without interference with travel along either.

The gate is operable as well from one side as from the other by the means provided by this invention, and the invention is applicable to any ordinary swinging gate without changing its construction.

The details of construction and arrangement of parts contemplated by this invention are disclosed in the accompanying drawings, forming part hereof, wherein a preferable embodiment of the invention is shown for purposes of illustration, and in which like reference characters refer to corresponding parts in both views, whereof—

Figure 1 is a perspective view of the gate and operating mechanism, and Fig. 2 is a plan view of the same.

Having more particular reference to the drawings, 3 is a gate hinged to a post 4 and having a spring-latch 5 engageable with a post 6. An arm 7 is attached to gate 3 near post 4, the arm extending beyond the post and being curved so as not to be interfered with when the gate is opened. Posts 8 and 9 are disposed on one side of the gate-post 4, and an arm 10 projects from the other side of said post. Posts 8 and 9 and arm 10 carry pulleys 11 for accommodation of the ropes for operating the gate. A rope 12 is attached to spring-latch lever $5^a$ and leads through a pulley $5^b$, disposed on and intermediate the ends of the gate. To the free end of rope 12 are attached ropes $12^a$ and $12^b$, both leading through pulleys on post 8 and one leading thence through a pulley 11 on post 9 and the other through a pulley 11 on arm 10. A rope 13 is attached to the free end of arm 7. To the free end of rope 13 are attached ropes $13^a$ and $13^b$, both leading through pulleys 11 on post 8 and one leading thence through a pulley 11 on post 9 and the other through a pulley 11 on arm 10.

When it is desired to open the gate, the operator draws one of the ropes $12^a$ or $12^b$, which will operate to pull back spring-latch lever $5^a$ to release the latch and simultaneously exert a pull on the gate at pulley $5^b$ and serve to swing the gate open. The operator after passing through the gate draws ropes $13^b$ or $13^a$, as the case may be, which draws arm 7 toward post 8, and thereby closes the gate.

Having thus described my invention, what I claim as new, and desire to disclose by Letters Patent, is—

The combination with a gate-post and a gate pivoted thereon and having a latch, of a curved arm attached to said gate and arranged to project around one side of said post, a rope-post on the same side of the gate-post as said arm, a stand-post beyond said rope-post, an arm projecting from said gate-post on the side opposite said arm, a latch-rope connected with said latch and leading through a guide on and intermediate the ends of the gate, a rope attached to said latch-rope and leading to the rope-post and thence to the stand-post and another rope attached to said latch-rope and leading to the arm on the gate-post, said ropes being so disposed as to be capable of releasing the latch and opening the gate, and a rope connected with the arm on the gate and leading to the rope-post and thence to the stand-post and another rope attached to said arm on the gate and leading to the arm on the gate-post, said latter ropes being so disposed as to be capable of closing the gate.

In testimony whereof I affix my signature in presence of two witnesses.

SYLVESTER ANDERSON.

Witnesses:
 FINIS TIREY,
 EVERETTE E. REUTER.